United States Patent [19]

Yamazaki et al.

[11] Patent Number: 5,607,582
[45] Date of Patent: Mar. 4, 1997

[54] FILTER SYSTEM FOR LIQUIDS

[75] Inventors: Kazuhiko Yamazaki, Yokohama; Mitsuhiro Goto, Kawasaki, both of Japan

[73] Assignee: Yamashin Filter Mfg. Corp., Yokohama, Japan

[21] Appl. No.: 345,925

[22] Filed: Nov. 28, 1994

[51] Int. Cl.⁶ ............... B01D 27/10; B01D 35/153
[52] U.S. Cl. ............... 210/234; 210/235; 210/238; 251/128; 251/149; 251/292; 251/314
[58] Field of Search ............... 210/232, 234, 210/235, 237, 238, 282, 418, 443, 450; 251/291, 292, 309, 314, 128, 149

[56] References Cited

U.S. PATENT DOCUMENTS

| | | |
|---|---|---|
| 2,955,712 | 10/1960 | Gutkowski . |
| 2,991,885 | 7/1961 | Gutkowski . |
| 3,326,375 | 6/1967 | Rosaen . |
| 3,326,376 | 6/1967 | Rosaen . |
| 3,399,776 | 9/1968 | Knuth . |
| 4,379,053 | 4/1983 | Brane . |
| 4,426,284 | 1/1984 | Mitchell . |
| 4,529,514 | 7/1985 | Gruett . |
| 4,529,515 | 7/1985 | Selz . |
| 4,588,504 | 5/1986 | Berges . |
| 4,615,812 | 10/1986 | Darling . |
| 4,818,397 | 4/1989 | Joy . |
| 4,832,077 | 5/1989 | Pilolla . |

FOREIGN PATENT DOCUMENTS

| | | |
|---|---|---|
| 617312 | 3/1961 | Canada . |
| 1240043 | 7/1959 | France . |
| 2615601 | 10/1976 | Germany . |

OTHER PUBLICATIONS

Yamashin Filter Mfg. Corp. Catalog pp. 44 and 45.

*Primary Examiner*—Thomas M. Lithgow
*Attorney, Agent, or Firm*—Wood, Phillips, Van Santen, Clark & Mortimer

[57] ABSTRACT

A filter system for a liquid, which system has a base with an inlet for incoming unfiltered liquid and an outlet for outgoing filtered liquid and a filter subassembly having a filter unit and structure for removably maintaining the filter unit in an operative position on the base. There is a first lead-in port on the base in communication with the base inlet and a first lead-out port on the base in communication with the base outlet. There is a second lead-in port on the filter unit and a second lead-out port on the filter unit. The filter unit further has structure for filtering liquid communicating between the second lead-in port and the second lead-out port. First structure cooperates between the base and filter subassembly for selectively a) establishing communication between the first lead-in port and the second lead-in port and the first lead-out port and the second lead-out port and b) blocking at least one of i) the first lead-in port and first lead-out port and ii) the second lead-in port and second lead-out port.

12 Claims, 4 Drawing Sheets

FILTER SYSTEM FOR LIQUIDS

BACKGROUND OF THE INVENTION

1. Field of the Invention

This invention relates to liquid filter systems and, more particularly, to a filter system having a replaceable filter unit that can be hermetically sealed before assembly and disassembly thereof to facilitate handling and disposal of the filter unit.

2. Background Art

Capsule-type filter systems, employing a replaceable filter unit, are used in a wide range of environments. For example, it is known to use these systems for filtering pressurized oil used in hydraulic circuits and/or for purposes of lubrication.

Typically, filter systems used for oil in hydraulic equipment have a main body which is placed in line on an oil delivery conduit to divert the oil to and through a filter medium. Many of these filter systems use a replaceable cartridge/filter unit that fits in a receptacle defined by a housing that is removably connected to the main body. The filter units typically have concentric, cylindrical, porous cores, with filtering medium disposed within the annular space between the cores. The filtering medium is folded to define pleats which account for an enlarged filtering surface area. The filtering medium is captively held between axially spaced plates. After a designated period of time, the housing is separated from the main body to expose the filter unit which is removed and replaced with a new filter unit.

During the replacement procedure, the spent filter unit drips oil and contaminants that adhere principally to the filter medium, thereby exposing the user handling the filter unit to the oil and contaminants. Further, cleanup of the area surrounding the filter system may be necessary. Still further, disposal of the spent filter unit is messy and inconvenient. Commonly after a change of filter unit takes place the used filter unit is placed in another receptacle to facilitate its transportation and may ultimately be disposed of with the transporting receptacle.

Further, once the filter unit is removed, any residual pressure in the conduit, into which the filter system is integrated, causes oil, that would be otherwise held captive by the housing for the filter unit, to discharge. It is often necessary to close the valves upstream and downstream of the filter system prior to removing the filter unit to avoid this condition, particularly at altitudes where atmospheric pressure is significantly reduced.

SUMMARY OF THE INVENTION

The present invention is specifically directed to overcoming the above enumerated problems in a novel and simple manner.

In one form of the invention, a filter system is provided for a liquid, which system has a base with an inlet for incoming unfiltered liquid and an outlet for outgoing filtered liquid and a filter subassembly having a filter unit and structure for removably maintaining the filter unit in an operative position on the base. There is a first lead-in port on the base in communication with the base inlet and a first lead-out port on the base in communication with the base outlet. There is a second lead-in port on the filter unit and a second lead-out port on the filter unit. The filter unit further has structure for filtering liquid communicating between the second lead-in port and the second lead-out port. First structure cooperates between the base and filter subassembly for selectively a) establishing communication between the first lead-in port and the second lead-in port and the first lead-out port and the second lead-out port and b) blocking at least one of i) the first lead-in port and first lead-out port and ii) the second lead-in port and second lead-out port.

With this arrangement, one or both of the filter unit and base can be sealed prior to disassembly of the filter unit, thereby avoiding release of liquid and contaminant from the filter unit as might contact the operator, his/her clothes, and the surrounding work area. A used filter unit can be hermetically sealed by blocking the ports in the filter unit and conveniently transported without spilling the liquid remaining therein.

This arrangement also prevents the discharge of oil from the base due to residual pressure in the line to which the filter system is attached, thereby obviating the need to provide shutoff valves upstream and/or downstream of the filter system.

The first cooperating structure may include a first plate having first and second openings, a second plate having third and fourth openings, and second structure cooperating between the filter subassembly, the first plate, the second plate, and the base for selectively placing the filter subassembly, base, first plate, and second plate in a) a first relative position wherein a liquid flow passage is established from the base inlet through the third opening in the second plate, the first opening in the first plate, the second lead-in port, the second lead-out port, the second opening in the first plate, the fourth opening in the second plate, the first lead-out port, and the base outlet and b) a second relative position wherein the first and second plates block liquid communication both i) between the first lead-in port and the second lead-in port and ii) between the second lead-out port and the first lead-out port.

The plates can be simply and inexpensively constructed, yet perform effectively in sealing the ports in the filter unit and base.

This construction permits the ports to communicate fully so that the liquid flow is substantially unobstructed, as by valve rods and discs in conventional hydraulic systems. This results in high efficiency filtering.

The second cooperating structure may include third structure cooperating between the second plate and base for guiding relative pivoting movement between the base and second plate around the first axis.

The third cooperating structure may include a first pin on one of the body and second plate and a first slot on the other of the body and second plate for receiving the first pin and guiding relative pivoting movement between the body and second plate within a predetermined range about the first axis, which range may be approximately 90°.

The second cooperating structure may include fourth structure cooperating between the first plate and filter subassembly for guiding relative pivoting movement between the filter subassembly and first plate around the first axis.

The fourth cooperating structure may include a second pin on one of the filter subassembly and first plate and a second slot on the other of the filter subassembly and first plate for receiving the second pin and guiding relative pivoting movement between the filter subassembly and first plate about the first axis within a second predetermined range, which range may be approximately 90°.

The structure for removably maintaining the filter unit in an operative position on the base may include a cup-shaped housing, defining a receptacle for at least a part of the filter unit, and structure cooperating between the cup-shaped housing and base for removably maintaining the cup-shaped housing in an assembled position on the base wherein the filter unit is captive in the operative position between the cup-shaped housing and the base.

The filter unit may include a handle to facilitate manipulation thereof.

The filtering structure may include a filtering medium that is at least one of a) an inorganic substance and b) natural fiber.

In another form of the invention, a filter system is provided for a liquid, which filter system has a base having an inlet for incoming unfiltered liquid and an outlet for outgoing filtered liquid, a filter subassembly having a filter unit and structure for removably maintaining the filter unit in an operative position on the base, first structure on the base and filter subassembly for a) directing incoming unfiltered liquid from the base inlet through the filter subassembly b) filtering liquid in the filter subassembly, and c) directing filtered liquid from the filter subassembly to the base outlet, and structure for sealing the filter unit to allow separation of the sealed filter unit from the base.

The structure for removably maintaining the filter unit in an operative position may include a cup-shaped housing defining a receptacle for at least a part of the filter unit, structure for removably maintaining the cup-shaped housing in an assembled position on the base wherein the filter unit in its operative position is captive between the cup-shaped housing and the base.

The structure for sealing the filter subassembly may include the cup-shaped housing, a first plate, and structure for attaching the first plate to the filter unit for movement selectively between a first sealed position and a second position.

The filter subassembly has a first lead-in port and a first lead-out port. The first plate has first and second openings and with the first plate in the first position the first plate blocks the first lead-in port and the first lead-out port and with the first plate in the second position, the first opening registers with the lead-in port and the second opening registers with the lead-out port.

In one form, the structure for attaching the first plate to the filter unit is structure for attaching the first plate to the filter unit for pivoting movement relative thereto about a first axis between the first and second positions.

The first structure may include a lead-in port on the base in communication with the base inlet, a lead-out port on the base in communication with the base outlet and second structure for selectively a) blocking the lead-in and lead-out ports on the base with the second structure in a first position and b) allowing communication of liquid from the base inlet through the base lead-in port to the filter unit and from the filter unit through the base lead-out port to the base outlet with the second structure in a second position.

The second structure may be a second plate that is pivotable about the first axis between its first and second positions.

The invention further contemplates structure cooperating between the filter unit, the first plate, the second plate, and base for moving the first plate from its first position into its second position and the second plate from its first position into its second position as an incident of the filter unit being pivoted about the first axis relative to the base.

The structure cooperating between the filter unit, the first plate, the second plate, and base may be structure for moving one of the first and second plates from its first position into its second position before moving the other of the first and second plates from its first position into its second position as an incident of the filter unit being pivoted about the first axis relative to the base.

DETAILED DESCRIPTION OF THE DRAWINGS

Figure 1:
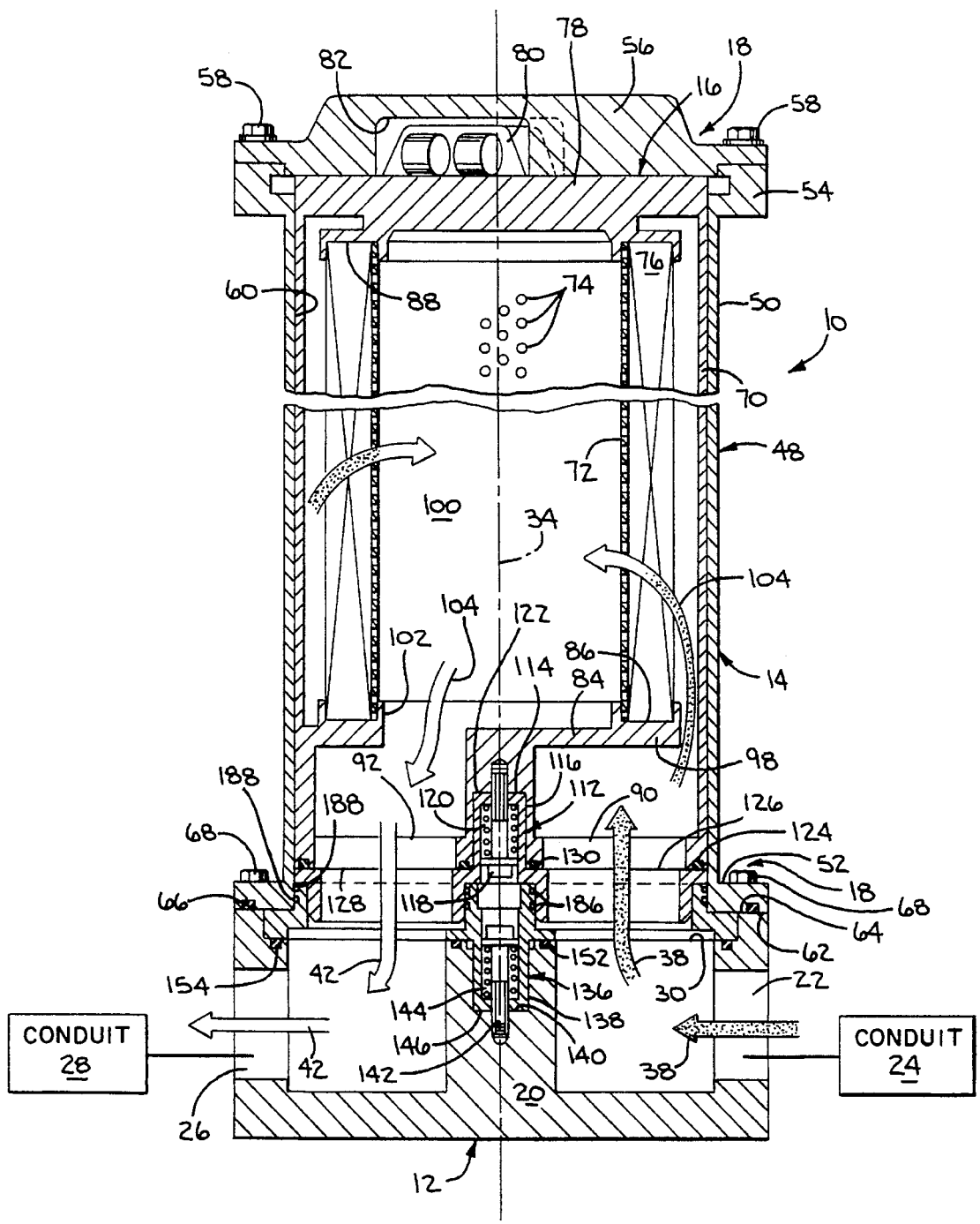
FIG. 1 is a cross-sectional view of an assembled filter system for liquid, according to the present invention, and in an operating state.
Figure 2:
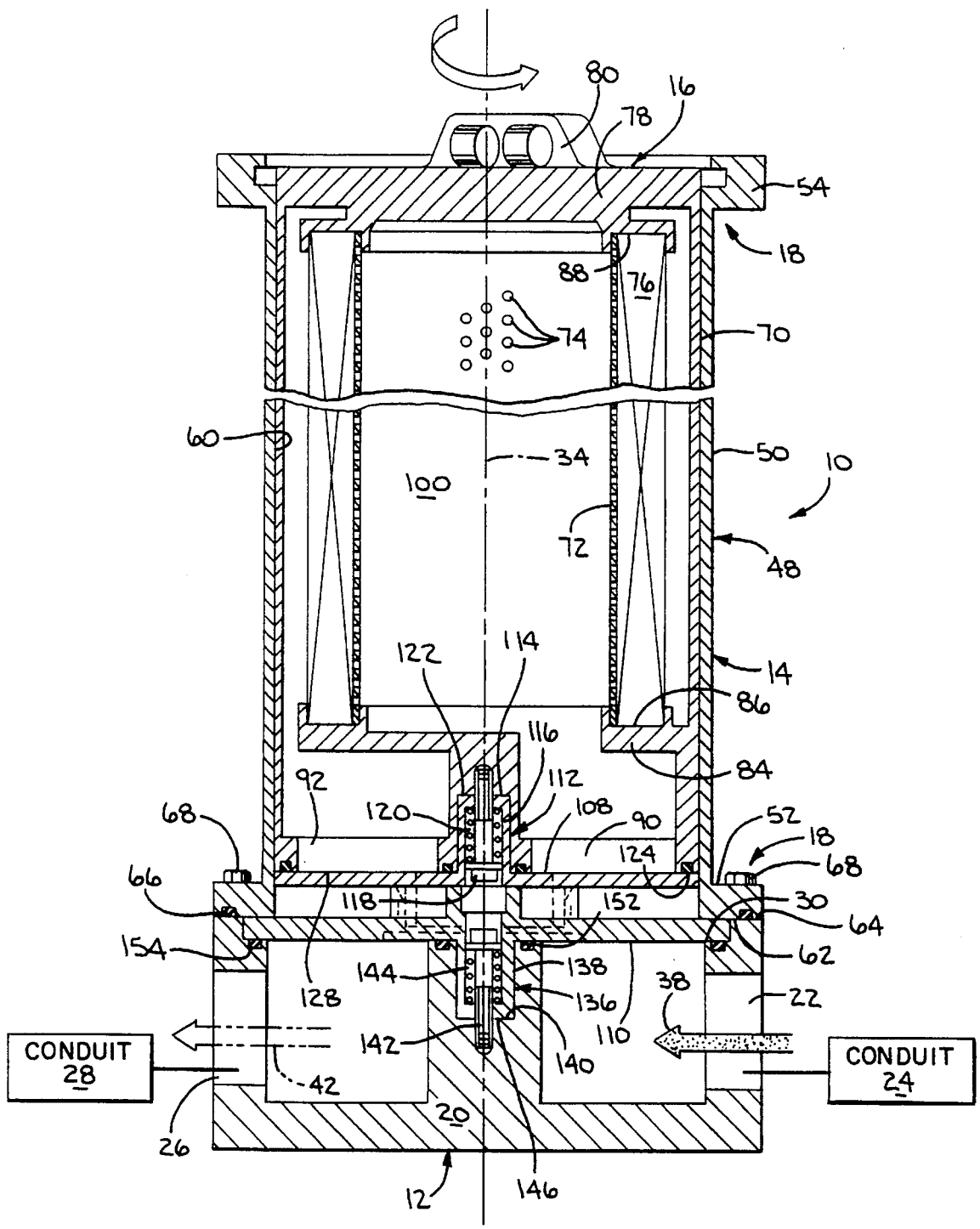
FIG. 2 is a view as in FIG. 1 with the system in a sealed/closed state and with a lid thereon removed to allow assembly and disassembly of a replaceable filter unit.
Figure 3:
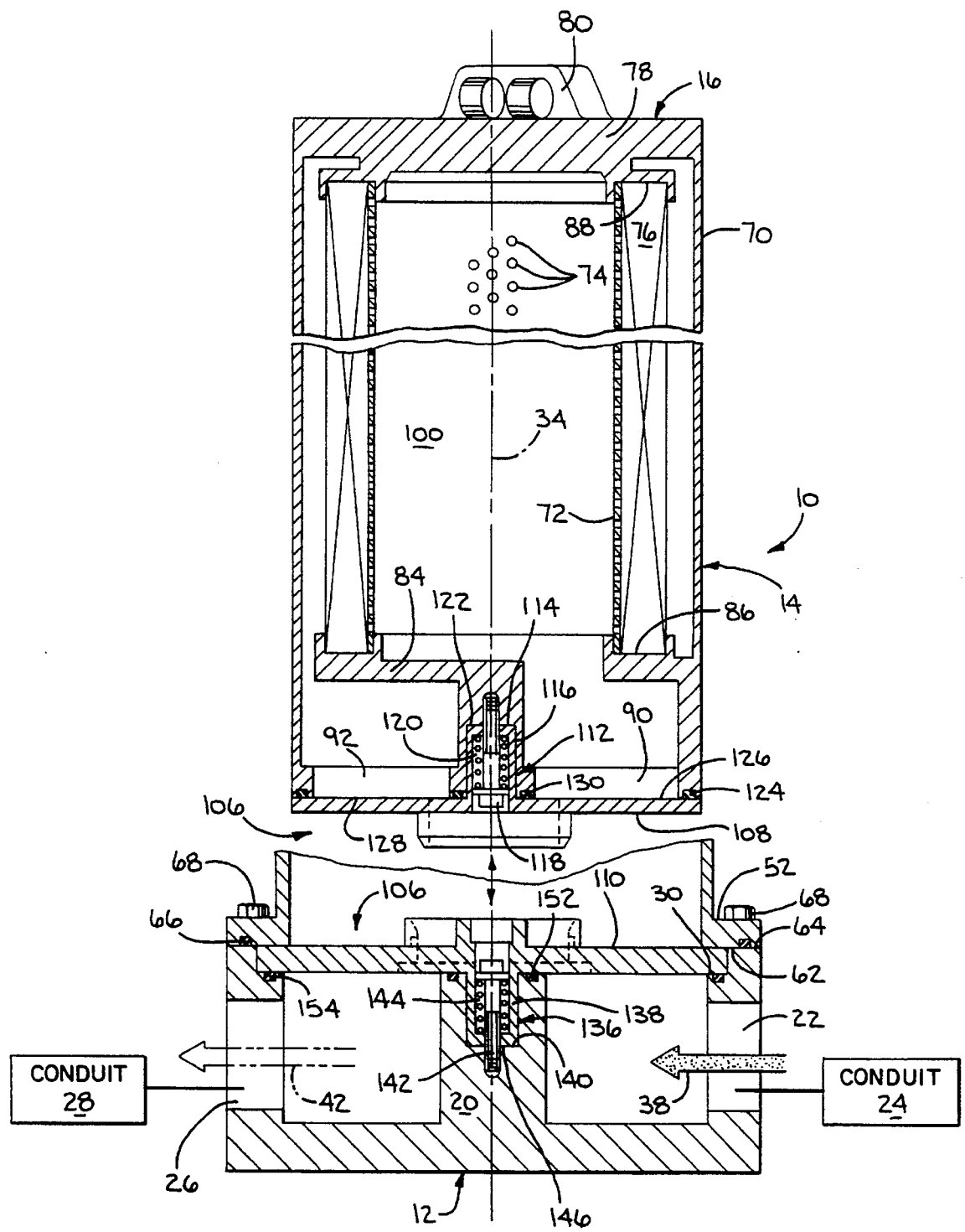
FIG. 3 is an exploded cross-sectional view of the inventive filter system showing the filter unit removed from a mounting base therefor.

A preferred form of liquid filter system, according to the present invention, is shown at 10 in FIGS. 1–5. The filter system 10 is defined by a base 12 and a filter subassembly 14 including a filter unit 16 and means at 18 for removably maintaining the filter unit 16 in an operative position on the base 12. The operative position for the filter unit is shown in FIGS. 1 and 2. It is intended that the base 12 and means 18, commonly collectively referred to in the industry as the filter head, be reusable. As described in detail below, the means 18 permits separation of the filter unit 16 from the base 12, as when its useful life is exhausted.

The base 12 has a cylindrical body 20 made of a rigid, high strength material, such as metal or molded thermoplastic, high-molecular resins, such as polyester, polypropylene, polyethylene, nylon, and polycarbonate, or other suitable material known to those skilled in the art. The body 20 has an inlet 22 for incoming, unfiltered liquid from a conduit 24 and an outlet 26 for outgoing, filtered liquid, which is delivered to a conduit 28. The conduits 24, 28 are part of a pipeline that directs a supply of pressurized liquid between two desired points.

The body 20 has an undercut surface 30 which defines a cylindrical receptacle 32 that is centered with the body 20 on a central axis 34 for the filter system 10. The body 20 has, within the receptacle 32, a circular lead-in port 36 which communicates through the body 20 with the base inlet 22 to allow communication of liquid from the conduit 24 through the inlet 22 and the lead-in port 36 in the direction of the arrows 38. A circular lead-out port 40 is defined through the surface 30 in the receptacle 32 and communicates through the body 20 to the base outlet 26 to allow outflow of liquid to the conduit 28 in the direction of the arrows 42. The central axes 44, 46 of the ports 36, 40 are spaced equidistantly from the central axis 34.

The means 18 includes an inverted, cup-shaped housing 48 defined by a cylindrical wall 50 having a radially outwardly extending flange 52 at its bottom end and a similar, radially outwardly extending, annular flange 54 at its upper end. The housing 48 further includes a cylindrical lid 56 that is removably maintained on the flange 54 by a plurality of bolts 58. The wall 50 and lid 56 together bound a cylindrical receptacle 60 within which the filter unit 16 resides.

A downwardly facing, annular surface 62 on the flange 52 can be placed facially against an oppositely facing surface 64 on the body 20. A sealing O-ring 66, or other suitable packing element, is disposed between the flange 52 and body 20 to hermetically seal the receptacle 60 within which the filter unit 16 resides. Bolts 68 are used to draw the flange 52 against the body 20 and thereby cause the O-ring 66 to be sealingly compressed between the flange 52 and body 20.

The wall 50 and lid 56 are preferably made from a rigid, high strength material such as metal, thermoplastic high-molecular resins, such as polyester, polypropylene, polyethylene or other suitable material known to those skilled in the art. The cup-shaped housing 48 is intended to be sufficiently rigid to positively hold the filter unit 16 in its operative position and to be reusable through the life of many filter units 16. The housing 48, with the above-described construction, can be made from low pressure-resistant material. This keeps manufacturing costs low, even if the housing 48 is required to be replaced during the life of the system 10.

The filter unit 16 has a cylindrical outer wall 70 and a concentric inner wall 72. The inner wall 72 has a multitude of pores 74 therethrough. A filter medium 76 extends completely around the inner wall 72.

To facilitate disposal of the filter unit 16, as by burning, the inner wall 72 and outer wall 70 of the filter unit 16 are molded from thermoplastic resin material, such as polyester, nylon, polypropylene, or the like. The filter medium 76 is preferably made from at least one of inorganic material, cloth made from unwoven natural fiber, filter paper, or the like.

The upper wall 78 of the filter unit 16 has a handle 80 molded as one piece therewith. The handle 80 is radially offset from the central axis 34 to facilitate the application of a positive torque to the filter unit 16, to effect assembly and disassembly thereof, as described below. The handle 80 is received within a complementarily formed recess 82 in the lid 56, which recess 82 breaks up the spiralling incoming liquid flow pattern. The handle 80 is keyed within the recess 82 to prevent relative rotation between the filter unit 16 and the housing 48.

To prevent leakage of liquid and contaminant from the filter medium 76, and for purposes of overall integrity and strength, the upper wall 78, outer wall 70 and a bottom wall 84 on the filter unit 16 are molded as one piece around the filter medium 76. The bottom wall 84 has an annular, undercut surface 86 to seat the bottom end of the filter medium 76 while the upper wall 78 has a like, oppositely facing, undercut surface 88 to seat the top end of the filter medium 76. The filter medium 76 is thus captively and sealingly maintained between the upper wall 78 and the bottom wall 84.

The filter unit 16 has a lead-in port 90 and a lead-out port 92. Each port 90, 92 has a circular cross section with the central axes 94, 96 thereof being spaced equidistantly from the central axis 34. Liquid flowing through the lead-in port 90 is guided by a partition 98 on the bottom wall 84 to against the peripheral outer surface of the filter medium 76. The liquid flows through the filter medium 76 and the porous inner wall 72 to an interior space 100 within the inner wall 72 and is from there communicated through an aperture 102 in the bottom wall 84 to the port 92. This liquid flow path from the port 90, through the filter medium 76, and to the poa 92 is indicated by the arrows 104.

The ports 90, 92 are situated so that the axes 94, 96 of the ports 90, 92 are alignable with the axes 44, 46 of the ports 36, 40 on the body 20. Means at 106, in the form of a first plate 108 and a second plate 110, cooperates between the base 12 and filter subassembly 14 for selectively a) establishing communication between the lead-in ports 36, 90 and the lead-out ports 92, 40 and b) blocking the ports 36, 40, 90, 92.

The first plate 108 is operably connected to the filter subassembly 14. More particularly, the first plate 108 has a spindle assembly 112 projecting upwardly at the center thereof into a correspondingly configured receptacle 114 defined in the filter unit 16. The spindle assembly 112 includes a hollow, upwardly projecting post 116, which nests in the receptacle 114. A mounting bolt 118 is directed through a stack of spring washers 120, the top wall 122 of the post 116 and into the bottom wall 84 of the filter unit 16 to biasably urge the plate 108 against the filter unit 16. One O-ring, or other suitable seal 124, is captively maintained between the upper wall surface 12 on the plate 108 and the bottom edge 128 of the wall 70. Another O-ring 130 surrounds the post 116 and further seals between the filter unit 16 and plate 108. This arrangement prevents leakage of liquid between the filter unit 16 and plate 108.

Figure 4:
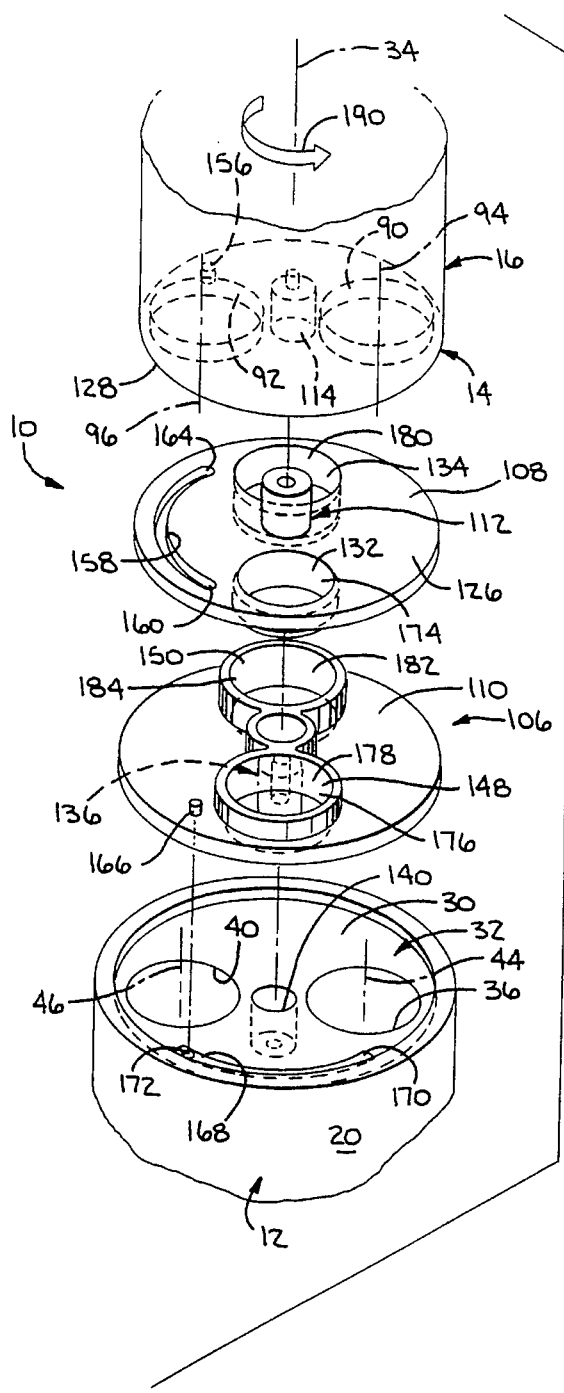
FIG. 4 is an exploded, fragmentary, perspective view of the filter system with rotary plates thereon positioned as in FIG. 4 to seal the filter unit and block liquid flow through the base.
Figure 5:
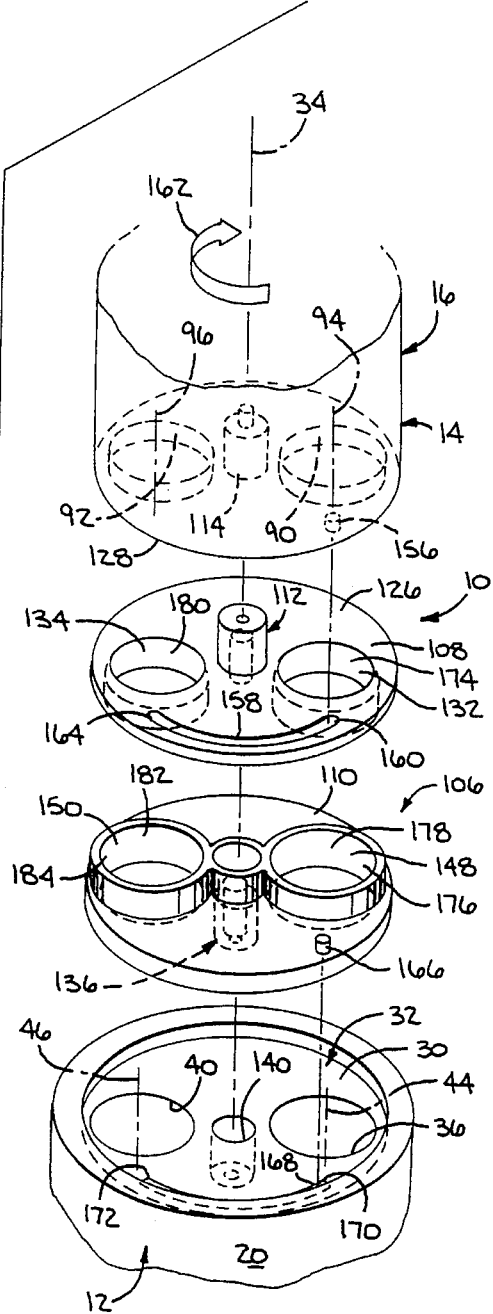
FIG. 5 is a view as in FIG. 4 with the rotary plates positioned as in FIG. 1 to allow liquid to flow into and out of the filter unit.

The plate 108 has through openings 132, 134 which are registrable with the ports 90, 92, respectively, with the spindle assembly 112 in the receptacle 114. The above arrangement allows the plate 108 to pivot about the axis 34 relative to the filter unit 16 to selectively bring the ports 90, 92 and openings 132, 134 into registration, as shown in FIG. 5, and out of registration, as shown in FIG. 4.

The plate 110 is mounted in similar fashion to the base 12. More particularly, the plate 110 has a spindle assembly at 136 including a downwardly projecting, hollow post 138 which projects into a correspondingly configured recess 140 in the body 20. A bolt 142 extends through a stack of spring washers 144, through the bottom wall 146 of the post 138 and into the body 20.

The plate 110 has through openings 148, 150 which can be selectively brought into and out of registration with the ports 36, 40 on the body 20 by pivoting the plate 110 around the axis 34. Inner and outer O-rings 152, 154 maintain a seal between the body 20 and plate 110 through the range of relative rotation therebetween.

The filter unit 16 has a downwardly projecting pin 156 which cooperates with an arcuate guide slot 158 formed in the plate 108. The guide slot 158 extends through approximately 90°. With the filter unit 16 and plate 108 in the FIG. 5 orientation, the post 156 resides in the slot at one end 160 thereof. In this arrangement, the ports 90, 92 are in registration with the openings 132, 134 in the plate 108. Rotation of the filter unit 16 in the direction of the arrow 162 causes the pin 156 to traverse the slot 158 through 90° until the pin 156 abuts the opposite end 164 of the guide slot 158. The plate 108 remains stationary in this 90° range. In this latter position, the ports 90, 92 and openings 132, 134 move completely out of registration so that the plate surface 126 blocks the ports 90, 92. Continued rotation of the filter unit 16 in the direction of the arrow 162 causes the plate 108 to follow movement of the filter unit 16 with the ports 90, 92 and openings 132, 134 remaining in the FIG. 4 position, i.e. out of registration with each other.

The bottom plate 110 has a depending pin 166 which moves in an arcuate guide slot 168 through approximately 90° in the same manner as the pin 156 moves in the guide slot 158. With the plate 110 and body 20 in the FIG. 5 orientation, the pin 166 is at one end 170 of the slot 168. Rotation of the plate 110 in the direction of the arrow 162 causes the pin 166 to move to the opposite end 172 of the guide slot 168. With the pin 166 at the one end 170 of the guide slot, the openings 148, 150 are in full registration with the ports 36, 40. Movement of the pin 166 to the other end 172 of the guide slot 168 causes the openings 148, 150 and ports 36, 40 to misalign, i.e. the plate 110 blocks the ports 36, 40.

To assemble the filter system 10, the plate 108 is pre-assembled to the filter unit 16 and the plate 110 is pre-assembled to the body 20. The filter unit 16 with the plate 108 thereon is then advanced axially towards the plate 110 on the body 20. As this occurs, the plates 108, 110 mesh, one within the other. That is, a depending ring 174 on the plate 108 bounding the opening 132 telescopes into a seat 176 defined by a ring 178 projecting upwardly from the plate 110 and bounding the opening 148. A similar, dependingr ring 180 bounding the opening 134 on the plate 108 telescopes into a seat 182 defined by a ring 184 projecting upwardly from the plate 110. The spindle assemblies 112, 136 also move axially one within the other as the plates 108, 110 are engaged. O-rings 186, 188 seal between the plates 108, 110 to prevent passage of liquid therebetween.

Assembly and operation of the filter system will now be described. The base 12 is initially placed in an upward orientation, as shown in all of the figures herein. The conduit 24 is connected to the inlet 22 and the conduit 28 connected to the outlet 26 by conventional means. The filter unit 16 and plate 108 are operatively connected by directing the pin 156 into the guide slot 158 in the FIG. 4 position and then maintaining this connection through the bolt 118. The body 20 is similarly connected to the plate 110 by directing the pin 166 into the guide slot 168 in the FIG. 4 position and then maintaining the connection through the bolt 142. The cylindrical wall 50 on the housing 48 is then bolted into position.

The filter unit 16 with the plate 108 thereon can then be directed axially through the wall 50 towards the body 20 with the plate 110 thereon until the rings 174, 180, 178, 184 telescopingly mate. This represents the closed filter position.

To place the filter system 10 in its operative state, the handle 80 is grasped and manipulated to rotate the filter unit 16 through 90° in the direction of the arrow 190 in FIG. 4. This bears the pin 156 against the end 160 of the guide slot 158, in which position the ports 90, 92 and openings 132, 134 are placed in full registration. Continued rotation of the filter unit 16 causes plates 108, 110 to continue rotating. After an additional 90° of rotation of the filter unit 16, the pin 166 travels in the guide slot 168 and abuts the end thereof. In this position, a continuous flow path is established inwardly through the port 36, the openings 148, 132 and port 90 and outwardly through the port 92, the openings 134, 150 and the poa 40.

Once the above state is established, the lid 56 can be bolted on the wall 50 to captively maintain the filter unit 16 in the operative position. Placement of the lid 56 seats the handle 80 in the recess 82 so that the handle 80 and associated filter unit 16 are keyed against rotation about the axis 34.

In this state, liquid, which may be oil, or the like, flows through the conduit 24, through the inlet 22 and port 36 on the body, through the plate openings 148, 132, and through the port 90 to against the filter medium 76. In flowing through the filtering medium 76 into the space 100, the liquid is filtered and purified. The filtered liquid then flows through the aperture 102, the plate openings 134, 150, the port 40, the outlet 26 and into the conduit 28.

When the life of the filter medium 76 is exhausted, the filter unit 16 is removed by initially removing the lid 56 to access the filter unit 16 and handle 80. The handle 80 is then grasped and manipulated to rotate the filter unit 16 from the open position of FIG. 5 in the direction of the arrow 162. As this occurs, the pin 156 moves in the guide slot 158 through 90° to against the slot end 164. As this occurs, the plate 108 blocks the ports 90, 92. Continued rotation of the filter unit 16 causes the pin 166 to move through 90° in the guide slot 168, thereby placing the pin 166 against the end 172 of the guide slot 168, which thereby causes the plate 110 to block the ports 36, 40 in the body 20.

Using the handle 80, the filter unit 16 can then be withdrawn from the space bounded by the cylindrical wall 50. The filter unit 16 in this state is a sealed unit. Any liquid remaining within the filter unit 16 is captive and cannot spill out onto the surrounding area or onto the operator. At the same time, the sealed filter unit 16 can be conveniently carried to a disposal site.

The ports 34, 36 on the body 20 remain blocked by the plate 110, as the filter unit 16 is removed, so that there will be no discharge of liquid therefrom caused by residual pressure in the conduits 24, 28, or by reason of a pressure differential attributable to a higher altitude environment. A replacement filter unit 16 is preferably reassembled with the system 10 in the FIG. 4 state.

The filter unit 16, as described above, has sufficient integrity, rigidity, and strength that it can be positively rotated through the handle 80 between the open and sealed filter states and conveniently transported through the handle 80.

Further, the composition of the filter unit 16 is such that it can be burned and reduced substantially fully to ashes.

Many variations of the above structure are contemplated by the invention. For example, the plates 108, 110 could be interlocked through other than the telescoping connection between the rings 174, 178, 180, 184.

The foregoing disclosure of specific embodiments is intended to be illustrative of the broad concepts comprehended by the invention.

We claim:

1. A filter system for liquid, said falter system comprising:

a base having an inlet for incoming unfiltered liquid and an outer for outgoing filtered liquid;

a filter subassembly comprising a filter unit with a filtering medium and inlet port means for communicating unfiltered liquid to the filtering medium and outlet port means for communicating liquid filtered by the filtering medium away from the filter unit, said base comprising first port means for communicating unfiltered liquid from the base inlet to the inlet port means on the filter unit to the filtering medium and second port means for communicating liquid filtered by the filtering medium and directed through the outlet port means on the filter unit to the base outlet, a first blocking element comprising a plate having first and second openings;

means cooperating between the first blocking element and filter unit for mounting the first blocking element to the filter unit for movement relative to the filter unit selectively between a first position wherein liquid can flow through the inlet port means on the filter unit to the filter medium and from the filter medium through the outlet port means on the filter unit and a second position wherein the first block element blocks the inlet and outlet port means on the filter unit;

a second blocking element comprising a plate having third and fourth openings;

means cooperating between the second blocking element and base for mounting the second blocking element to the base for movement relative to the base between a first position wherein liquid can flow from the base inlet through the first port means on the base and through the second port means on the base to the base outlet and a second position wherein the second blocking element blocks the first; and second port means on the base;

means cooperating between the base and filter unit for removably maintaining the filter unit in an operative position on the base, said filter unit being repositionable relative to the base between a separated position and the operative position; and means cooperating between the base, the filter unit, and first and second blocking elements for a) moving the first blocking element into its first position and the second blocking element into its first position so that liquid can communicate from the base inlet through the first port means on the base and the inlet port means on the filter unit to the filter medium and from the filter medium through the outlet port means on the filter unit and the second port means on the base to the base outlet as an incident of the filter unit moving from the separated position into the operative position and b) moving the first blocking element into its second position and the second blocking element into its second position so that communication of liquid from the base inlet through the first port means on the base and to the second port means on the base to the base outlet is blocked by the second blocking element and communication of liquid through the inlet port means on the filter unit to the filtering medium and from the filtering medium through the outlet port means on the filter unit is blocked by the first blocking element as an incident of the filter unit being moved from its operative position towards the separated position.

2. The filter system according to claim 1 wherein the blocking element plates are movable relative to the base, the filter unit, and each other with the filter unit in the operative position on the base around a first axis.

3. The filter system according to claim 1 wherein the means cooperating between the base, the filter unit and the first and second blocking elements comprises a first pin on one of the base and blocking, element plates and a first slot on the other of the base and the one of the blocking element plates for receiving the first pin and guiding relative pivoting movement between the base and the one of the blocking element plates within a first predetermined range about a first axis.

4. The filter system according to claim 3 wherein the first slot extends through a range of approximately 90°.

5. The filter system according to claim 3, wherein the means cooperating between the base, the filter unit, and the first and second blocking elements comprises a second pin on one of the filter unit and the other of the blocking element plates and a second slot on the other of the other of the blocking element plates and filter unit for receiving the second pin and guiding relative pivoting movement between the filter unit and the other of the blocking element plates about the first axis within a second predetermined range.

6. The filter system according to claim 5 wherein the second slot extends through a range of approximately 90°.

7. The filter system according to claim 1 wherein the means cooperating between the base and filter unit comprises a cup-shaped housing defining a receptacle for at least a part of the filter unit and means cooperating between the cup-shaped housing and base for removably maintaining the cup-shaped housing on the base so that the filter unit is captive between the cup-shaped housing and the base.

8. The filter system according to claim 1 wherein the filter unit includes a handle to facilitate manipulation of the filter unit.

9. The filter system according to claim 1 wherein the filtering medium is at least one selected from the group consisting of an inorganic substance and natural fiber.

10. The filter system according to claim 1 wherein the means cooperating between the first blocking element and filter unit and the second blocking element and base comprises means for allowing the filter unit with the first blocking element thereon to be fully separated from the base with the second blocking element thereon.

11. The filter system according to claim 1 wherein the first blocking element substantially fully blocks the port means on the filter unit with the first blocking element in its second position and the second blocking element substantially fully blocks the: port means on the base with the second blocking element into its second position and the filter unit removed and fully separated from the base.

12. The filter system according to claim 1 wherein the means cooperating between the base, the filter unit, and the first and second blocking elements comprises means for moving one of the first and second blocking elements from its first position into its second position before the other of the first and second blocking elements is moved from its first position into its second position as the filter unit is moved from the operative position towards the separated position.

* * * * *